United States Patent
Nakakita et al.

(10) Patent No.: US 12,149,082 B2
(45) Date of Patent: Nov. 19, 2024

(54) COMMAND GENERATION DEVICE AND COMMAND GENERATION METHOD

(71) Applicant: MITSUBISHI HEAVY INDUSTRIES ENGINE & TURBOCHARGER, LTD., Sagamihara (JP)

(72) Inventors: Osamu Nakakita, Sagamihara (JP); Masayuki Tanaka, Sagamihara (JP); Masato Mitsuhashi, Tokyo (JP); Fujio Eguchi, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 535 days.

(21) Appl. No.: 17/625,261

(22) PCT Filed: Aug. 7, 2020

(86) PCT No.: PCT/JP2020/030419
§ 371 (c)(1),
(2) Date: Jan. 6, 2022

(87) PCT Pub. No.: WO2021/029373
PCT Pub. Date: Feb. 18, 2021

(65) Prior Publication Data
US 2022/0255320 A1 Aug. 11, 2022

(30) Foreign Application Priority Data
Aug. 9, 2019 (JP) .................. 2019-148070

(51) Int. Cl.
*H02J 3/18* (2006.01)
*G05B 19/042* (2006.01)

(52) U.S. Cl.
CPC .......... *H02J 3/1885* (2013.01); *G05B 19/042* (2013.01); *G05B 2219/2639* (2013.01)

(58) Field of Classification Search
CPC .. H02J 3/1885; G05B 19/042; G05B 19/2639
See application file for complete search history.

(56) References Cited

U.S. PATENT DOCUMENTS

| 9,698,603 B2* | 7/2017 | Sugimoto | H02J 3/38 |
| 2016/0006338 A1* | 1/2016 | Sakimoto | H02M 7/53875 363/131 |
| 2021/0175711 A1* | 6/2021 | Yoshizawa | H02J 3/26 |

FOREIGN PATENT DOCUMENTS

| JP | 2009-225599 A | 10/2009 |
| JP | 2013-162623 A | 8/2013 |

(Continued)

OTHER PUBLICATIONS

International Search Report for PCT/JP2020/030419 mailed on Nov. 2, 2020.

(Continued)

*Primary Examiner* — Gary L Laxton
(74) *Attorney, Agent, or Firm* — Birch, Stewart, Kolasch & Birch, LLP (57) ABSTRACT

This command generation device generates a control command for a power conversion device which converts DC power outputted by a DC power supply device to AC power and supplies the same to a bus, and which converts AC power from the bus to DC power and supplies the same to the DC power supply device. Said command generation device comprises: a virtual power generation calculation unit which simulates the driving of a virtual power generator and, on the basis of a rotor model that calculates the rotational speed of the virtual power generator, calculates the root-mean-square voltage and phase of the virtual power generator; a bus calculation unit which calculates the voltage and phase at a point of contact between the power conversion device and the bus; a phase difference angle calculation unit which calculates the phase difference angle between the phase of the virtual power generator and the phase at the point of contact; a target power determination unit which determines a target value for the effective power of the power conversion device on the basis of the root-mean- (Continued)

square voltage of the virtual power generator, the voltage at the point of contact and the phase difference angle; and a command generation unit which generates a control command for the power conversion device on the basis of the determined target value for the effective power.

12 Claims, 6 Drawing Sheets

(56) References Cited

FOREIGN PATENT DOCUMENTS

| JP | 6084863 B2 | 2/2017 |
| JP | 2017-208932 A | 11/2017 |
| JP | 6386718 B2 | 9/2018 |
| WO | WO 2015/075923 A1 | 5/2015 |
| WO | WO 2019/092877 A1 | 5/2019 |

OTHER PUBLICATIONS

Written Opinion of the International Searching Authority for PCT/JP2020/030419 (PCT/ISA/237) mailed on Nov. 2, 2020.
International Search Report for International Application No. PCT/JP2020/030419, dated Nov. 2, 2020, with an English translation.
Written Opinion of the International Searching Authority for International Application No. PCT/JP2020/030419, dated Nov. 2, 2020, with an English translation.

* cited by examiner

COMMAND GENERATION DEVICE AND COMMAND GENERATION METHOD

TECHNICAL FIELD

The present disclosure relates to a command generation device and a command generation method for generating a control command for a power conversion device of a DC power supply device.

This application is based upon and claims the benefit of priority from Japanese Patent Application No. 2019-148070, filed Aug. 9, 2019, the entire contents of which are incorporated herein by reference.

BACKGROUND ART

PTL 1 discloses a technique of stabilizing a system by allowing an inverter to have functions of a governor and an automatic voltage regulator (AVR) of a synchronous power generator. According to the technique described in PTL 1, a control logic is modeled assuming that a bus is an infinite bus. The infinite bus means an ideal power supply in which a change in frequency and voltage does not occur even in a case where a large change in a load connected to the bus occurs.

CITATION LIST

Patent Literature

[PTL 1] Japanese Patent No. 6084863

SUMMARY OF INVENTION

Technical Problem

On the other hand, in a so-called microgrid system or an off-grid system that supplies electric power by an autonomous operation, the electric power of the bus is likely to be changed due to a change in the load connected to the bus. For this reason, in the technique described in PTL 1, there is a possibility that a power conversion device cannot be stably controlled due to a change in power supply and demand of the bus. Further, in order to stabilize a relationship of the power supply and demand of the bus, it is necessary to appropriately control not only supply of the power to the bus by the power conversion device but also consumption of the power from the bus.

An object of the present disclosure is to provide a command generation device and a command generation method capable of stably controlling the power conversion device connected to the bus.

Solution to Problem

According to a first aspect, there is provided a command generation device that generates a control command for a power conversion device which converts DC power output by a DC power supply device into AC power and supplies the AC power to a bus and which converts AC power of the bus into DC power and supplies the DC power to the DC power supply device, the command generation device including: a virtual power generation calculation unit that calculates a root-mean-square voltage value and a phase of a virtual power generator based on a rotor model for simulating a drive of the virtual power generator and calculating a rotation speed of the virtual power generator; a bus calculation unit that calculates a voltage and a phase of a connection point between the power conversion device and the bus; a phase difference angle calculation unit that calculates a phase difference angle between the phase of the virtual power generator and the phase of the connection point; a target power determination unit that determines a target value of active power of the power conversion device based on the root-mean-square voltage value of the virtual power generator, the voltage of the connection point, and the phase difference angle; and a command generation unit that generates the control command for the power conversion device based on the determined target value of the active power.

According to a first aspect, there is provided a command generation method that generates a control command for a power conversion device which converts DC power output by a DC power supply device into AC power and supplies the AC power to a bus and which converts AC power of the bus into DC power and supplies the DC power to the DC power supply device, the command generation method including: a step of calculating a root-mean-square voltage value and a phase of a virtual power generator based on a rotor model for simulating a drive of the virtual power generator and calculating a rotation speed of the virtual power generator; a step of measuring a voltage and a phase of a connection point between the power conversion device and the bus; a step of calculating a phase difference angle between the phase of the virtual power generator and the phase of the connection point; a step of determining a target value of active power of the power conversion device based on the root-mean-square voltage value of the virtual power generator, the voltage of the connection point, and the phase difference angle; and a step of generating the control command for the power conversion device based on the determined target value of the active power.

Advantageous Effects of Invention

According to at least one aspect of the aspects, it is possible to stably control the power conversion device connected to the bus.

DESCRIPTION OF EMBODIMENTS

First Embodiment

Figure 1:
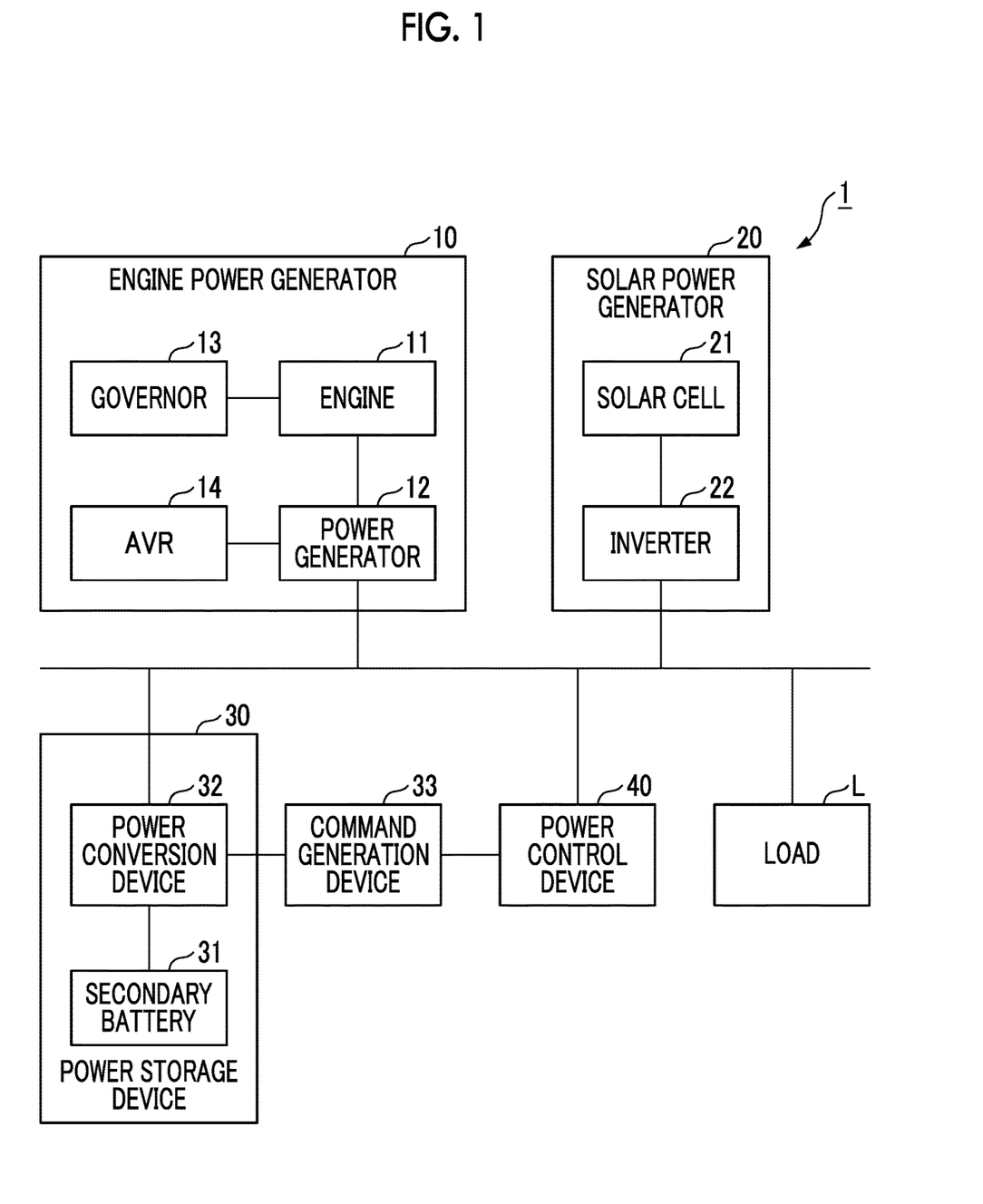
FIG. 1 is a schematic block diagram illustrating a configuration of a power supply system according to a first embodiment.

FIG. 1 is a schematic block diagram illustrating a configuration of a power supply system according to a first embodiment.

(Configuration of Power Supply System)

A power supply system 1 according to the first embodiment includes an engine power generator 10, a solar power generator 20, a power storage device 30, a command generation device 33, and a power control device 40. The power supply system 1 supplies power to a load L by an autonomous operation. That is, the power supply system 1 is a so-called microgrid system or an off-grid system. The engine power generator 10, the solar power generator 20, and the power storage device 30 are connected to a bus, and supply power to the load L via the bus.

The engine power generator 10 includes an engine 11, a power generator 12, a governor 13, and an automatic voltage regulator (AVR) 14. The engine power generator 10 is an AC power generator that generates AC power by driving the power generator 12 by rotation of the engine 11.

The governor 13 controls a rotation speed of the engine 11 by an Hz-kW droop characteristic. A governor characteristic of the engine power generator 10 is represented by, for example, a slope of a linear function connecting a plot related to a rated output and a rated frequency and a plot related to a settling frequency which is settled in a no-load state where the load is cut off from a zero output and a rated output. That is, the Hz-kW droop characteristic is a characteristic in which an output decreases as a frequency increases. In another embodiment, the governor characteristic may be realized by a proportional integral differential (PID) control. The AVR 14 adjusts a terminal voltage of the power generator by controlling a current supplied to a field magnet winding of the power generator 12 by a V-kbar droop characteristic. The V-kbar droop characteristic is a characteristic in which reactive power decreases as a voltage increases. In another embodiment, another AC power generator may be used instead of the engine power generator 10.

The solar power generator 20 includes a solar cell 21 and an inverter 22. The solar cell 21 is a DC power supply device that converts sunlight into DC power. The inverter 22 converts the DC power generated by the solar cell 21 into AC power. The inverter 22 and the solar cell 21 do not necessarily have to be provided one-to-one. For example, a plurality of solar cells 21 may be connected to one inverter 22. In another embodiment, instead of the solar power generator 20, another renewable energy generator such as a wind power generator may be used.

The power storage device 30 includes a secondary battery 31 as a DC power supply device and a power conversion device 32. A control command of the power conversion device 32 includes a target value of active power and a target value of reactive power. The power conversion device 32 converts the DC power which is output by the secondary battery 31 into AC power based on a command from the command generation device 33, and supplies the AC power to the bus, the AC power being synchronized with a voltage frequency of the bus. The power conversion device 32 synchronizes output power with the voltage frequency of the bus by a PLL control. Further, the power conversion device 32 converts a part of the AC power flowing through the bus into DC power based on a control command generated by the command generation device 33 according to a command from the power control device 40, and charges the secondary battery 31 using the DC power. As the secondary battery 31, for example, a lithium ion secondary battery may be used. The power conversion device 32 is a general-purpose current control type inverter that operates according to a control command related to a PQ control. The power conversion device 32 according to another embodiment may operate according to a control command related to a target value of apparent power, a target value of a power factor angle, and a target value of a voltage frequency.

The power conversion device 32 and the secondary battery 31 do not necessarily have to be provided one-to-one. For example, a plurality of secondary batteries 31 may be connected to one power conversion device 32.

The command generation device 33 generates a control command for controlling the power conversion device 32 of the power storage device 30 based on a command from the power control device 40, and outputs the control command to the power storage device 30. The command generation device 33 is a device provided separately from the power storage device 30.

The power control device 40 monitors a power value of the bus, and outputs a charge/discharge command to the engine power generator 10 and the power storage device 30. For example, in a case where the power generated by the solar power generator 20 is equal to or larger than a predetermined threshold value, such as in a daytime, the power control device 40 outputs a power command to decrease the power generated by the engine power generator 10 or stop power generation by the engine power generator 10. Further, in a case where the power generated by the solar power generator 20 is smaller than a predetermined threshold value, such as in a night-time or in bad weather, the power control device 40 outputs a power command to increase the power generated by the engine power generator 10.

In addition, for example, the power control device 40 outputs, based on a change in the power generated by the solar power generator 20, a charge/discharge command for smoothing the change to the power storage device 30. Further, the power control device 40 compares the power value of the bus with a demand power value according to the load L, and outputs a charge/discharge command to the power storage device 30 based on a difference in power.

(Configuration of Command Generation Device)

Figure 2:
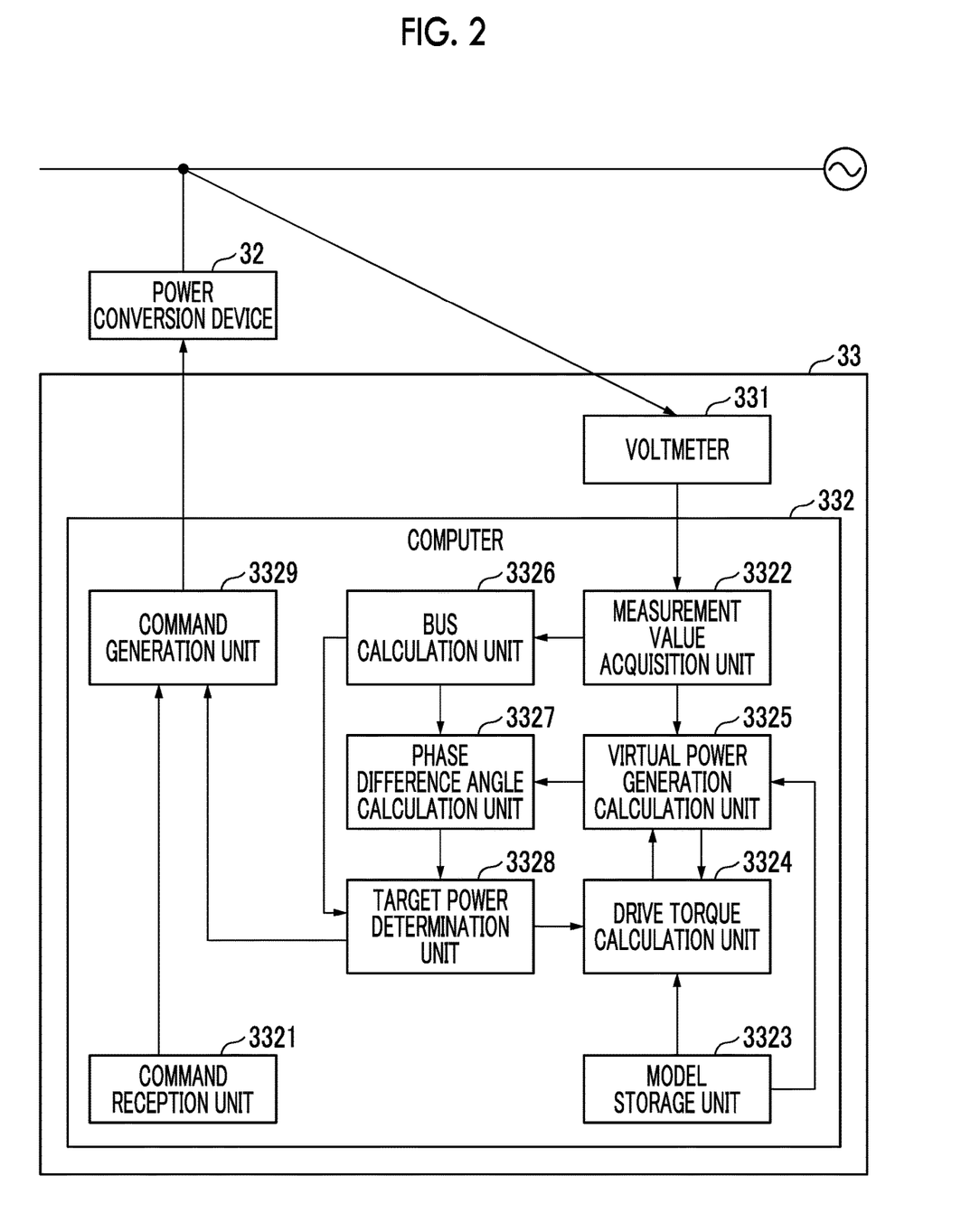
FIG. 2 is a schematic block diagram illustrating a configuration of a command generation device according to the first embodiment.

FIG. 2 is a schematic block diagram illustrating a configuration of the command generation device according to the first embodiment.

The command generation device 33 according to the first embodiment includes a voltmeter 331 and a computer 332. The voltmeter 331 measures a voltage of a connection point between the power conversion device 32 and the bus. The computer 332 generates a control command based on a measurement value of the voltmeter 331.

The computer 332 includes a command reception unit 3321, a measurement value acquisition unit 3322, a model storage unit 3323, a drive torque calculation unit 3324, a virtual power generation calculation unit 3325, a bus calculation unit 3326, a phase difference angle calculation unit 3327, a target power determination unit 3328, and a command generation unit 3329.

The command reception unit 3321 receives a charge/discharge command from the power control device 40. The charge/discharge command includes an active power command value and a reactive power command value.

The measurement value acquisition unit 3322 acquires the measurement value of the voltmeter 331. That is, the measurement value acquisition unit 3322 acquires an instantaneous voltage value of the connection point.

The model storage unit 3323 stores a mathematical model for simulating a behavior of a virtual power generator. Specifically, the model storage unit 3323 stores a governor model M1 for simulating a behavior of a governor of a virtual power generator and a rotor model M2 for simulating a behavior of a rotor of a virtual power generator. In a case where an angular velocity of a rotor of a virtual power generator and an angular velocity command value are input to the governor model M1, the governor model M1 outputs a drive torque value of the virtual power generator. In a case where an electric torque value and a drive torque value of the virtual power generator are input to the rotor model M2, the rotor model M2 outputs an angular velocity and a phase angle of a rotor of the virtual power generator. Details of each mathematical model will be described later.

The drive torque calculation unit 3324 calculates a drive torque value of the virtual power generator by inputting, to the governor model M1, a target value of the active power determined by the target power determination unit 3328 and the angular velocity of the rotor of the virtual power generator calculated by the virtual power generation calculation unit 3325 in a previous control. The virtual power generation calculation unit 3325 calculates an angular velocity and a phase angle of the rotor of the virtual power generator by inputting, to the rotor model M2, the drive torque value calculated by the drive torque calculation unit 3324. Further, the virtual power generation calculation unit 3325 calculates a root-mean-square voltage value of the virtual power generator based on the phase of the rotor and the measurement value of the voltmeter 331 acquired by the measurement value acquisition unit 3322. For example, the measurement value acquisition unit 3322 calculates a root-mean-square voltage value of a frequency component of the rotor by sampling the instantaneous voltage value of the bus at a frequency of the rotor by a phase lock loop (PLL) circuit and performing frequency conversion on the sampled data.

The bus calculation unit 3326 calculates a root-mean-square voltage value and a phase of the connection point based on the measurement value of the voltmeter 331 acquired by the measurement value acquisition unit 3322. For example, the bus calculation unit 3326 calculates a root-mean-square voltage value of a fundamental wave component by sampling the instantaneous voltage value of the bus at the connection point in synchronization with a fundamental wave frequency by a PLL circuit and performing frequency conversion on the sampled data. Further, for example, the bus calculation unit 3326 calculates a phase of the connection point based on the sampling performed in synchronization with the fundamental wave frequency.

The phase difference angle calculation unit 3327 calculates a phase difference angle as a difference between the phase of the bus calculated by the bus calculation unit 3326 and the phase of the rotor of the virtual power generator calculated by the virtual power generation calculation unit 3325.

The target power determination unit 3328 determines a target value of the active power based on the root-mean-square voltage value of the virtual power generator calculated by the virtual power generation calculation unit 3325, the root-mean-square voltage value of the bus calculated by the bus calculation unit 3326, and the phase difference angle calculated by the phase difference angle calculation unit 3327. Specifically, the target power determination unit 3328 determines a target value of the active power based on the following Equation (1).

$$P_{vsg} = V_{grid} \times V_{vsg} \div X \times \sin \Delta\theta \quad (1)$$

Here, $P_{vsg}$ indicates the target value of the active power. $V_{grid}$ indicates the root-mean-square voltage value of the bus. $V_{vsg}$ indicates the root-mean-square voltage value of the virtual power generator. X indicates a series reactance between the virtual power generator and the bus. As a value of X, for example, a value twice the value which is set as a reactance of the virtual power generator may be used. The series reactance X is a value which is at least larger than the reactance of the virtual power generator. $\Delta\theta$ indicates the phase difference angle between the bus and the virtual power generator. Equation (1) is based on an equivalent circuit in which the series reactance X and the virtual power generator are connected in series with respect to the bus. In another embodiment, the target power determination unit 3328 may determine the target value of the active power by solving a Y parameter of a two-terminal-pair circuit in which the bus and the virtual power generator are connected. Equation (1) is equivalent to a case where an admittance of a $\pi$-type circuit which is an equivalent circuit of a two-terminal-pair circuit is set to 0.

The command generation unit 3329 generates a control command for the power conversion device 32 based on the target value of the active power determined by the target power determination unit 3328 and the charge/discharge command received from the power control device 40 by the command reception unit. The command generation unit 3329 outputs the generated control command to the power conversion device 32.

(Configuration of Mathematical Model)

Figure 3:
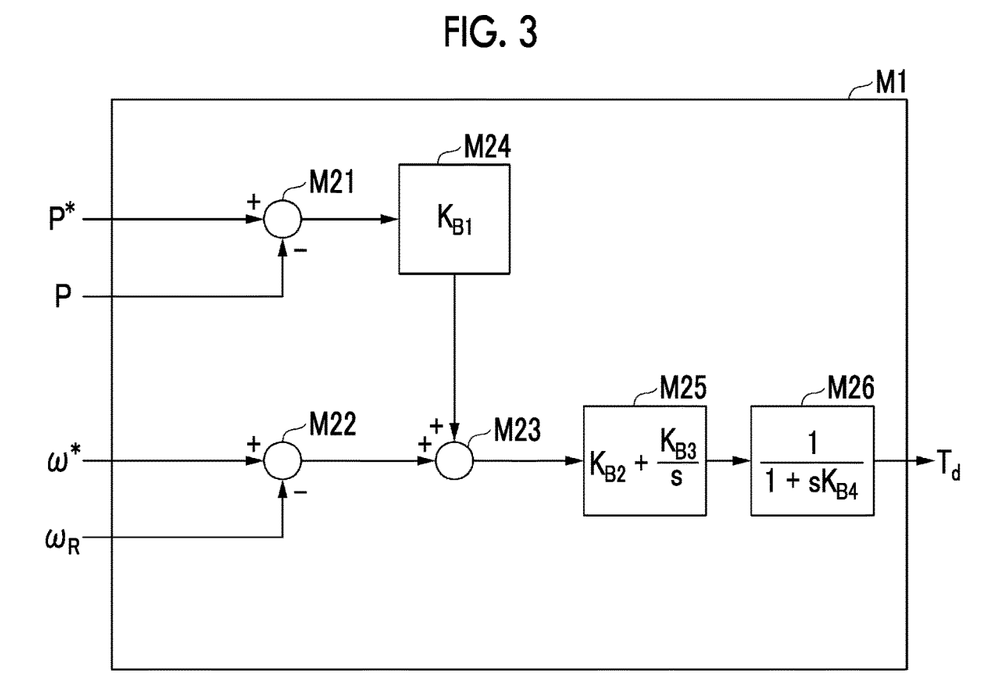
FIG. 3 is a block diagram illustrating an example of a governor model according to the first embodiment.

FIG. 3 is a block diagram illustrating an example of the governor model according to the first embodiment.

In a case where the measurement value P of the active power, the active power command value P*, the angular velocity $\omega_R$ of the rotor of the virtual power generator, and the target value $\omega^*$ of the angular velocity are input to the governor model M1, the governor model M1 outputs a drive torque value $T_d$ of the virtual power generator. Specifically, the governor model M1 includes addition points M21, M22, and M23, a P block M24, a PI block M25, and a primary delay block M26. At the addition point M21, a difference between the measurement value P of the active power and the active power command value P* is obtained. The P block M24 performs a P control according to a proportional gain KB1 on the output of the addition point M21. The proportional gain KB1 corresponds to a Hz-kW droop gain of the virtual power generator. At the addition point M22, a difference between the angular velocity $\omega_R$ of the rotor of the virtual power generator and the target value $\omega^*$ of the angular velocity is obtained. At the addition point M23, a sum of the output of the addition point M22 and the output of the P block M24 is obtained. The PI block M25 performs a PI control according to a proportional gain KB2 and an integral gain KB3 on the output of the addition point M23. The primary delay block M26 obtains a drive torque value $T_d$ by performing a primary delay control according to a time constant KB4 on the output of the PI block M25.

Figure 4:
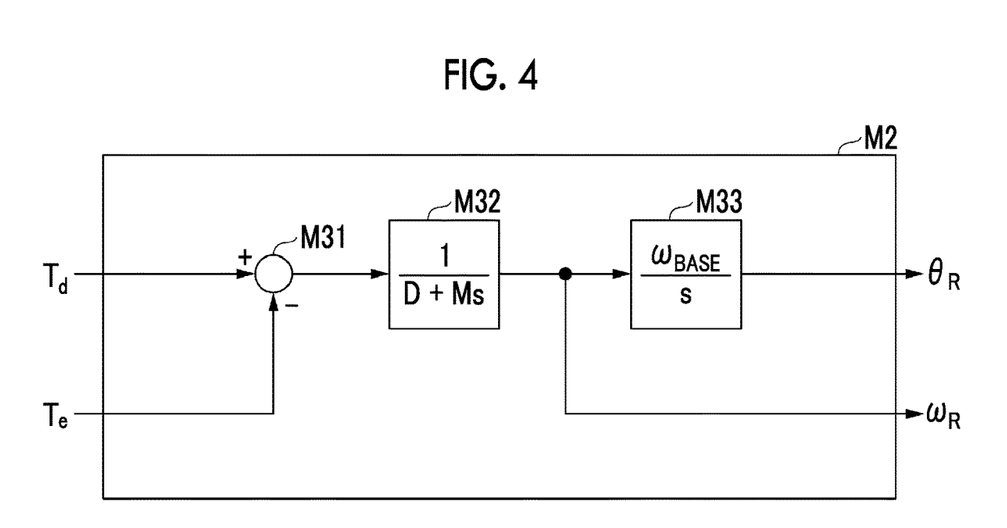
FIG. 4 is a block diagram illustrating an example of a rotor model according to the first embodiment.

FIG. 4 is a block diagram illustrating an example of the rotor model according to the first embodiment.

In a case where a load torque value $T_e$ and a drive torque value $T_d$ of the virtual power generator are input to the rotor model M2, the rotor model M2 outputs an angular velocity $\omega_R$ and a phase angle $\theta_R$ of the rotor of the virtual power generator. Specifically, the rotor model M2 includes an addition point M31, a primary delay block M32, and an I block M33. At the addition point M31, a difference between the load torque value $T_e$ and the drive torque value $T_d$ of the virtual power generator is obtained. The primary delay block M32 obtains an angular velocity $\omega_R$ of the rotor by performing, on the output of the addition point M31, primary delay response calculation according to a primary delay gain 1/D and a time constant M/D. The I block M33 obtains a phase angle $\theta_R$ of the rotor of the virtual power generator by integrating the angular velocity $\omega_R$ of the rotor and multiplying a result of the integration by a proportional gain $\omega_{BASE}$. The proportional gain $\omega_{BASE}$ is a reference frequency of the bus.

(Operation)

According to the configuration, the computer 332 obtains the phase and the angular velocity of the virtual power generator, from the active power command value and the angular velocity command value, based on the governor model M1 and the rotor model M2. Further, the computer 332 obtains the root-mean-square voltage value and the phase of the bus and the root-mean-square voltage value of the virtual power generator, from the measurement value of the voltmeter 331. The computer 332 obtains a phase difference angle as a difference between the phase of the virtual power generator and the phase of the bus. The computer 332 determines a target value of the active power based on the root-mean-square voltage value of the bus, the root-mean-square voltage value of the virtual power generator, and the phase difference angle, and generates a control command for the power conversion device 32 based on the target value of the active power. The power conversion device 32 operates according to the control command generated by the command generation device 33. Thereby, characteristics corresponding to the virtual power generator are realized.

(Action and Effect)

The command generation device 33 according to the first embodiment obtains the root-mean-square voltage value and the phase of the bus from the measurement value of the instantaneous voltage value of the connection point, and determines the target value of the active power of the power conversion device 32 based on the root-mean-square voltage value of the virtual power generator, the voltage of the connection point, and the phase difference angle. Thereby, the command generation device 33 can realize a stable control of the power conversion device 32 by controlling the power conversion device 32 according to a change in the frequency and the voltage of the bus.

Second Embodiment

In the command generation device 33 according to the first embodiment, the frequency of the virtual power generator and the bus frequency can be synchronized with each other. In a case where the frequency of the virtual power generator and the bus frequency are synchronized with each other, the power conversion device 32 is controlled while maintaining the phase difference angle at a synchronization timing. That is, the phase difference angle is in an offset state. On the other hand, as the phase difference angle is closer to 0, a synchronization stability is higher, and as an absolute value of the phase difference angle is closer to n (180 degrees), a synchronization stability is lower. In particular, in order to stably operate the system, preferably, the absolute value of the phase difference angle is within $\pi/2$ (90 degrees). For this reason, the command generation device 33 according to the second embodiment synchronizes the frequency of the virtual power generator and the bus frequency while making the phase difference angle close to 0.

Figure 5:
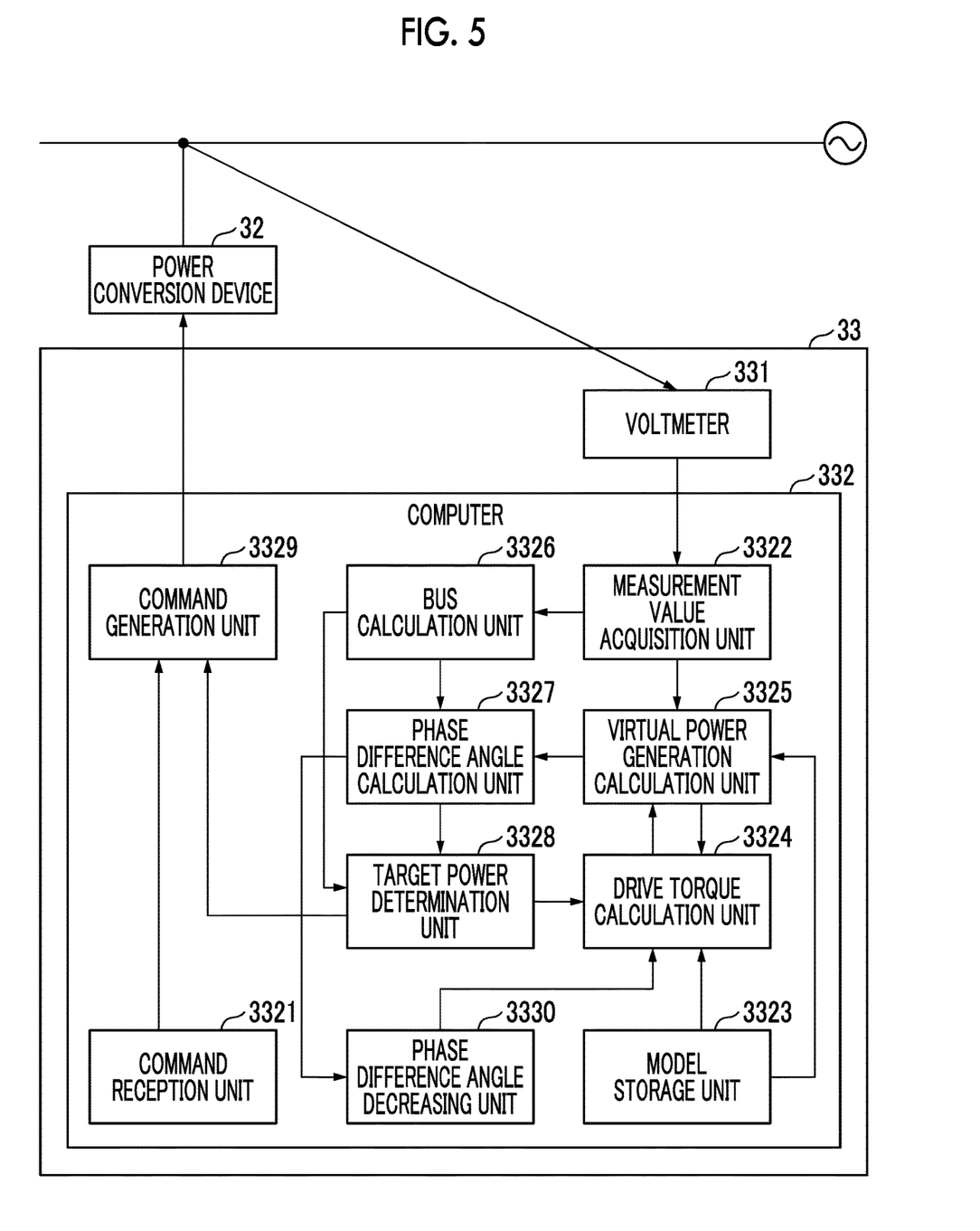
FIG. 5 is a schematic block diagram illustrating a configuration of the command generation device according to a second embodiment.

FIG. 5 is a schematic block diagram illustrating a configuration of the command generation device according to the second embodiment.

The command generation device according to the second embodiment further includes a phase difference angle decreasing unit 3330 in addition to the configuration according to the first embodiment.

In a case where the phase difference angle calculated by the phase difference angle calculation unit 3327 is input and a PI control is performed, the phase difference angle decreasing unit 3330 calculates a correction rotation speed for canceling the phase difference angle, and corrects the angular velocity command value by adding the correction rotation speed to the angular velocity command value received by the command reception unit 3321. The drive torque calculation unit 3324 calculates a drive torque based on the corrected angular velocity command value.

(Action and Effect)

The command generation device 33 according to the second embodiment corrects the target value of the rotation speed such that the phase difference angle approaches 0, and calculates the root-mean-square voltage value and the phase of the virtual power generator based on the rotor model M2 and the corrected target value of the rotation speed. Thereby, the command generation device 33 can synchronize the frequency of the virtual power generator and the bus frequency while making the phase difference angle close to 0. Therefore, the command generation device 33 can reduce a possibility that the absolute value of the phase difference angle exceeds $\pi/2$ and the system is in an unstable state due to an instantaneous change of the bus frequency.

Third Embodiment

As described above, in order to stably operate the system, preferably, the absolute value of the phase difference angle is within $\pi/2$. For this reason, the command generation device 33 according to a third embodiment controls the power conversion device 32 such that the phase difference angle always remains in a stable region.

Figure 6:
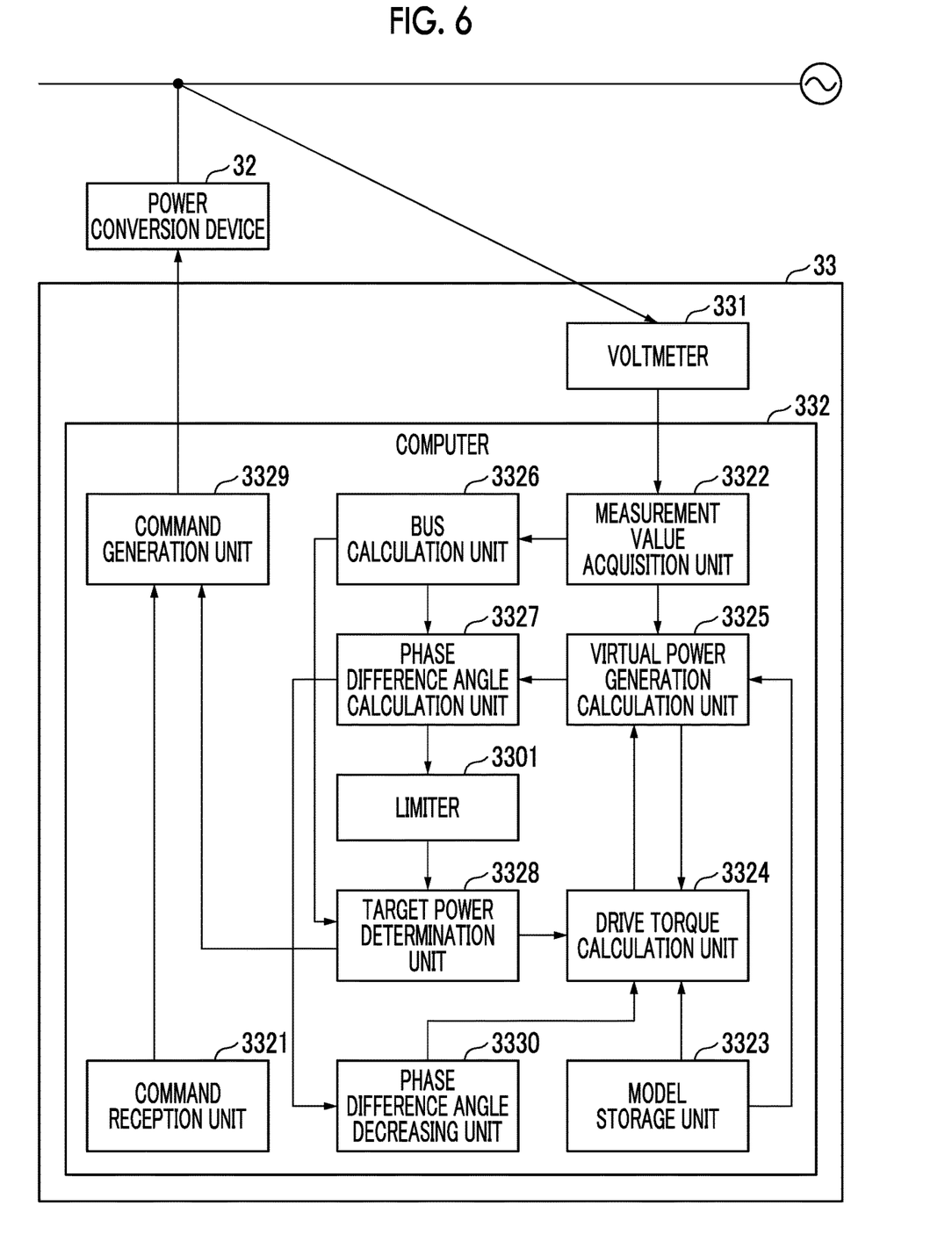
FIG. 6 is a schematic block diagram illustrating a configuration of the command generation device according to a third embodiment.

FIG. 6 is a schematic block diagram illustrating a configuration of the command generation device according to the third embodiment.

The command generation device according to the third embodiment further includes a limiter 3301 in addition to the configuration according to the second embodiment. The limiter 3301 limits the phase difference angle calculated by the phase difference angle calculation unit 3327 to a value within a range of $-\pi/2$ to $+\pi/2$. The target power determination unit 3328 determines the target value of the active power of the power conversion device 32 based on the phase difference angle limited by the limiter 3301. Thereby, the command generation device 33 can always make the phase difference angle remain in a stable region.

As described above, one embodiment has been described in detail with reference to the drawings. On the other hand, a specific configuration is not limited to the above-described configuration, and various design changes may be made. That is, in other embodiments, an order of the processing may be changed as appropriate. In addition, parts of the processing may be executed in parallel.

The command generation device 33 according to the above-described embodiment may be configured by a single computer. The configuration of the command generation device 33 may be divided into a plurality of computers. In this case, the plurality of computers may cooperate with each other, and thus may function as the command generation device 33.

The target power determination unit 3328 of the command generation device 33 according to the above-described embodiment determines the target value of the active power based on the root-mean-square voltage value of the virtual power generator, the voltage of the connection point, and the phase difference angle. On the other hand, in other embodiments, in addition to the target value of the active power, a target value of the reactive power may be further determined. The target value $Q_{vsg}$ of the reactive power may be obtained by, for example, the following Equation (2).

$$Q_{vsg}=V_{vsg}(V_{vsg}-V_{grid}\times\cos\Delta\theta)\div X \qquad (2)$$

[Computer Configuration]

Figure 7:
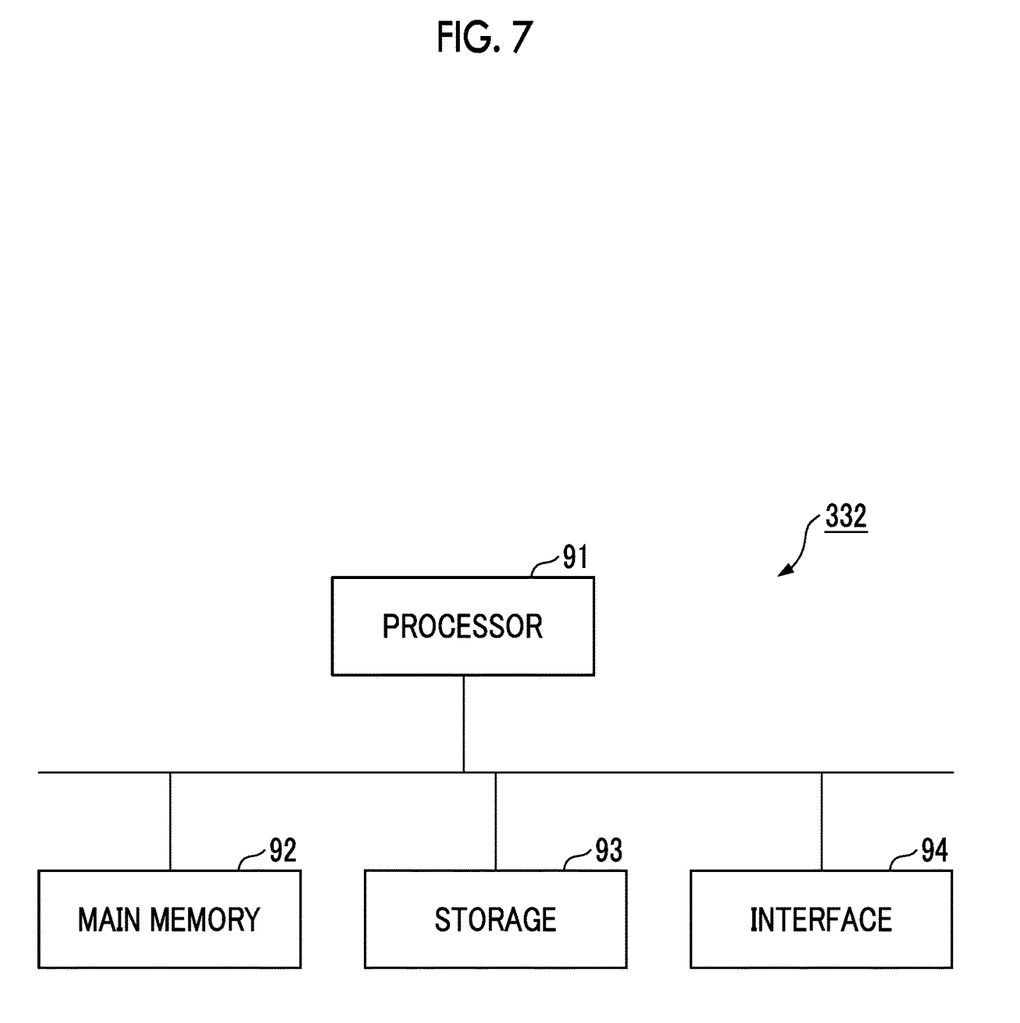
FIG. 7 is a schematic block diagram illustrating a configuration of a computer according to at least one embodiment.

FIG. 7 is a schematic block diagram illustrating a configuration of the computer according to at least one embodiment.

The computer 332 includes a processor 91, a main memory 92, a storage 93, and an interface 94.

The command generation device 33 is provided in the computer 332. The operation of each processing unit described above is stored in the storage 93 in a form of a program. The processor 91 reads the program from the storage 93, develops the program in the main memory 92, and executes the above-described processing according to the program. Further, the processor 91 allocates a storage area corresponding to each storage unit in the main memory 92 according to the program. Examples of the processor 91 include a central processing unit (CPU), a graphic processing unit (GPU), a microprocessor, and the like.

The program may be a program for realizing some of the functions exhibited by the computer 332. For example, the functions of the program may be exhibited in combination with another program already stored in the storage or in combination with another program provided in another device. In another embodiment, the computer 332 may include a customized large scale integrated circuit (LSI) such as a programmable logic device (PLD) in addition to or instead of the above configuration. Examples of PLD include a programmable array logic (PAL), a generic array logic (GAL), a complex programmable logic device (CPLD), and a field programmable gate array (FPGA). In this case, some or all of the functions realized by the processor 91 may be realized by the integrated circuit. The integrated circuit is also included as an example of a processor.

Examples of the storage 93 include a hard disk drive (HDD), a solid state drive (SSD), a magnetic disk, an optical magnetic disk, a compact disc read only memory (CD-ROM), and a digital versatile disc read only memory (DVD-ROM), a semiconductor memory, and the like. The storage 93 may be an internal medium directly connected to a bus of the computer 332, or an external medium connected to the computer 332 via the interface 94 or a communication line. Further, in a case where the program is distributed to the computer 332 via a communication line, the computer 332 that receives the program may develop the program in the main memory 92 and execute the processing. In at least one embodiment, the storage 93 is a non-transitory tangible storage medium.

Further, the program may be a program for realizing some of the functions. Further, the program may be a so-called difference file (difference program) that realizes the functions in combination with another program already stored in the storage 93.

APPENDIX

The command generation device and the command generation method described in each embodiment can be understood, for example, as follows.

(1) According to a first aspect, there is provided a command generation device 33 that generates a control command for a power conversion device 32 which converts DC power output by a DC power supply device 31 into AC power and supplies the AC power to a bus and which converts AC power of the bus into DC power and supplies the DC power to the DC power supply device, the command generation device 33 including: a virtual power generation calculation unit 3325 that calculates a root-mean-square voltage value and a phase of a virtual power generator based on a rotor model M2 for simulating a drive of the virtual power generator and calculating a rotation speed of the virtual power generator; a bus calculation unit 3326 that calculates a voltage and a phase of a connection point between the power conversion device 32 and the bus; a phase difference angle calculation unit 3327 that calculates a phase difference angle between the phase of the virtual power generator and the phase of the connection point; a target power determination unit 3328 that determines a target value of active power of the power conversion device based on the root-mean-square voltage value of the virtual power generator, the voltage of the connection point, and the phase difference angle; and a command generation unit 3329 that generates the control command for the power conversion device 32 based on the determined target value of the active power.

Thereby, the command generation device 33 can realize a stable control of the power conversion device 32 by controlling the power conversion device 32 according to a change in the frequency and the voltage of the bus.

(2) According to a second aspect, in the command generation device 33 according to the first aspect, the target power determination unit 3328 may determine the target value of the active power of the power conversion device 32 by dividing a product of the root-mean-square voltage value of the virtual power generator, the voltage of the connection point, and a sine of the phase difference angle by a predetermined series reactance larger than a reactance of the virtual power generator.

(3) According to a third aspect, the command generation device 33 according to the first aspect or the second aspect may further include: a command reception unit 3321 that receives an angular velocity command value of the virtual power generator; and a phase difference angle decreasing unit 3330 that corrects the angular velocity command value such that the phase difference angle approaches zero. The virtual power generation calculation unit 3325 may calculate the root-mean-square voltage value and the phase of the virtual power generator based on the rotor model M2 and the corrected angular velocity command value.

Thereby, the command generation device 33 can synchronize the frequency of the virtual power generator and the bus frequency while making the phase difference angle close to zero.

(4) According to a fourth aspect, the command generation device 33 according to any one of the first to third aspects may further include: a limiter 3301 that limits the calculated phase difference angle to a value within a range of $-\pi/2$ to $+\pi/2$. The target power determination unit 3328 may determine the target value of the active power of the power conversion device 32 based on the limited phase difference angle.

Thereby, the command generation device 33 can always make the phase difference angle remain in a stable region.

(5) According to a fifth aspect, in the command generation device according to any one of the first to fourth aspects, the target power determination unit 3328 may further determine a target value of reactive power of the power conversion device 32 based on the root-mean-square voltage value of the virtual power generator, the voltage of the connection point, and the phase difference angle.

Thereby, the command generation device 33 can supply the reactive power according to the phase difference angle to the power conversion device 32, and thus a voltage stability of a system can be improved.

(6) According to a sixth aspect, there is provided a command generation method that generates a control command for a power conversion device which converts DC power output by a DC power supply device into AC power and supplies the AC power to a bus and which converts AC power of the bus into DC power and supplies the DC power to the DC power supply device, the command generation method including: a step of calculating a root-mean-square voltage value and a phase of a virtual power generator based on a rotor model for simulating a drive of the virtual power generator and calculating a rotation speed of the virtual power generator; a step of measuring a voltage and a phase of a connection point between the power conversion device and the bus; a step of calculating a phase difference angle between the phase of the virtual power generator and the phase of the connection point; a step of determining a target value of active power of the power conversion device based on the root-mean-square voltage value of the virtual power generator, the voltage of the connection point, and the phase difference angle; and a step of generating the control command for the power conversion device based on the determined target value of the active power.

Thereby, a stable control of the power conversion device 32 can be realized by controlling the power conversion device 32 according to a change in a frequency and a voltage of the bus.

REFERENCE SIGNS LIST

1: power supply system
10: engine power generator
11: engine
12: power generator
13: governor
14: AVR
20: solar power generator
21: solar cell
22: inverter
30: power storage device
31: secondary battery (DC power supply device)
32: power conversion device
33: command generation device
40: power control device
331: voltmeter
332: computer
3321: command reception unit
3322: measurement value acquisition unit
3323: model storage unit
3324: drive torque calculation unit
3325: virtual power generation calculation unit
3326: bus calculation unit
3327: phase difference angle calculation unit
3328: target power determination unit
3329: command generation unit
3330: phase difference angle decreasing unit
3301: limiter

The invention claimed is:

1. A command generation device that generates a control command for a power conversion device which converts DC power output by a DC power supply device into AC power and supplies the AC power to a bus and which converts AC power of the bus into DC power and supplies the DC power to the DC power supply device, the command generation device comprising:
    a virtual power generation calculation unit that calculates a root-mean-square voltage value and a phase of a virtual power generator based on a rotor model for simulating a drive of the virtual power generator and calculating a rotation speed of the virtual power generator;
    a bus calculation unit that calculates a voltage and a phase of a connection point between the power conversion device and the bus;
    a phase difference angle calculation unit that calculates a phase difference angle between the phase of the virtual power generator and the phase of the connection point;
    a target power determination unit that determines a target value of active power of the power conversion device based on the root-mean-square voltage value of the virtual power generator, the voltage of the connection point, and the phase difference angle; and
    a command generation unit that generates the control command for the power conversion device based on the determined target value of the active power.

2. The command generation device according to claim 1, wherein the target power determination unit determines the target value of the active power of the power conversion device by dividing a product of the root-mean-square voltage value of the virtual power generator, the voltage of the connection point, and a sine of the phase difference angle by a predetermined series reactance larger than a reactance of the virtual power generator.

3. The command generation device according to claim 1, further comprising:
    a command reception unit that receives an angular velocity command value of the virtual power generator; and
    a phase difference angle decreasing unit that corrects the angular velocity command value such that the phase difference angle approaches zero,
    wherein the virtual power generation calculation unit calculates the root-mean-square voltage value and the phase of the virtual power generator based on the rotor model and the corrected angular velocity command value.

4. The command generation device according to claim 1, further comprising:
    a limiter that limits the calculated phase difference angle to a value within a range of $-\pi/2$ to $+\pi/2$,
    wherein the target power determination unit determines the target value of the active power of the power conversion device based on the limited phase difference angle.

5. The command generation device according to claim 1, wherein the target power determination unit further determines a target value of reactive power of the power conversion device based on the root-mean-square voltage value of the virtual power generator, the voltage of the connection point, and the phase difference angle.

6. The command generation device according to claim 2, further comprising:
    a command reception unit that receives an angular velocity command value of the virtual power generator; and a phase difference angle decreasing unit that corrects the angular velocity command value such that the phase difference angle approaches zero, wherein the virtual power generation calculation unit calculates the root-mean-square voltage value and the phase of the virtual power generator based on the rotor model and the corrected angular velocity command value.

7. The command generation device according to claim 2, further comprising:

a limiter that limits the calculated phase difference angle to a value within a range of $-\pi/2$ to $+\pi/2$, wherein the target power determination unit determines the target value of the active power of the power conversion device based on the limited phase difference angle.

8. The command generation device according to claim 3, further comprising:

a limiter that limits the calculated phase difference angle to a value within a range of $-\pi/2$ to $+\pi/2$, wherein the target power determination unit determines the target value of the active power of the power conversion device based on the limited phase difference angle.

9. The command generation device according to claim 2, wherein the target power determination unit further determines a target value of reactive power of the power conversion device based on the root-mean-square voltage value of the virtual power generator, the voltage of the connection point, and the phase difference angle.

10. The command generation device according to claim 3, wherein the target power determination unit further determines a target value of reactive power of the power conversion device based on the root-mean-square voltage value of the virtual power generator, the voltage of the connection point, and the phase difference angle.

11. The command generation device according to claim 4, wherein the target power determination unit further determines a target value of reactive power of the power conversion device based on the root-mean-square voltage value of the virtual power generator, the voltage of the connection point, and the phase difference angle.

12. A command generation method that generates a control command for a power conversion device which converts DC power output by a DC power supply device into AC power and supplies the AC power to a bus and which converts AC power of the bus into DC power and supplies the DC power to the DC power supply device, the command generation method comprising:

a step of calculating a root-mean-square voltage value and a phase of a virtual power generator based on a rotor model for simulating a drive of the virtual power generator and calculating a rotation speed of the virtual power generator;

a step of measuring a voltage and a phase of a connection point between the power conversion device and the bus;

a step of calculating a phase difference angle between the phase of the virtual power generator and the phase of the connection point;

a step of determining a target value of active power of the power conversion device based on the root-mean-square voltage value of the virtual power generator, the voltage of the connection point, and the phase difference angle; and a step of generating the control command for the power conversion device based on the determined target value of the active power.

\* \* \* \* \*